United States Patent
Vrcelj et al.

(10) Patent No.: US 8,605,690 B2
(45) Date of Patent: *Dec. 10, 2013

(54) METHODS AND APPARATUS FOR TIME TRACKING USING ASSISTANCE FROM TDM PILOTS IN A COMMUNICATION NETWORK

(75) Inventors: Bojan Vrcelj, San Diego, CA (US); Ashok Mantravadi, San Diego, CA (US); Krishna Kiran Mukkavilli, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 12/917,789

(22) Filed: Nov. 2, 2010

(65) Prior Publication Data
US 2011/0116396 A1  May 19, 2011

Related U.S. Application Data

(63) Continuation of application No. 11/970,381, filed on Jan. 7, 2008, now Pat. No. 7,839,831.

(60) Provisional application No. 60/883,993, filed on Jan. 8, 2007.

(51) Int. Cl.
*H04J 3/00* (2006.01)
*H04J 3/06* (2006.01)
*H04B 3/10* (2006.01)
*H04L 7/00* (2006.01)

(52) U.S. Cl.
USPC ........... 370/337; 370/350; 370/500; 370/503; 375/354

(58) Field of Classification Search
USPC .......... 370/320, 350, 503, 337, 500; 375/148, 375/354, 371
See application file for complete search history.

(56) References Cited

U.S. PATENT DOCUMENTS

| | | | |
|---|---|---|---|
| 6,370,397 | B1 | 4/2002 | Popovic et al. |
| 6,731,622 | B1 | 5/2004 | Frank et al. |

(Continued)

FOREIGN PATENT DOCUMENTS

| | | |
|---|---|---|
| EP | 829988 A2 | 3/1998 |
| EP | 1416693 A2 | 5/2004 |

(Continued)

OTHER PUBLICATIONS

International Search Report—PCT/US08/050515, International Search Authority—European Patent Office—May 20, 2008.

(Continued)

*Primary Examiner* — Un C Cho
*Assistant Examiner* — Jeremy Costin
(74) *Attorney, Agent, or Firm* — Fulbright & Jaworski LLP

(57) ABSTRACT

Methods and apparatus for time tracking using assistance from TDM pilots in a communication network. In an aspect, a method is provided for time tracking in a device operating on a communication network, wherein the device performs a time tracking algorithm. The method includes determining a delay spread, and modifying at least one parameter used by the time tracking algorithm based on the delay spread. In another aspect, an apparatus is provided for time tracking in a device operating on a communication network, wherein the device performs a time tracking algorithm. The apparatus includes computation logic for determining a delay spread, and control logic for modifying at least one parameter used by the time tracking algorithm based on the delay spread.

23 Claims, 7 Drawing Sheets

(56) References Cited

U.S. PATENT DOCUMENTS

| | | |
|---|---|---|
| 7,839,831 B2 | 11/2010 | Vrcelj et al. |
| 2004/0190560 A1 | 9/2004 | Maltsev et al. |
| 2005/0018758 A1* | 1/2005 | Keranen et al. ............... 375/148 |
| 2005/0163265 A1 | 7/2005 | Gupta |
| 2005/0195791 A1 | 9/2005 | Sung et al. |
| 2006/0209669 A1* | 9/2006 | Nishio ......................... 370/208 |
| 2006/0233097 A1 | 10/2006 | Vrcelj et al. |
| 2006/0239367 A1 | 10/2006 | Wilhelmsson et al. |
| 2006/0245349 A1 | 11/2006 | Vrcelj et al. |
| 2007/0263736 A1 | 11/2007 | Yuda et al. |
| 2007/0280098 A1 | 12/2007 | Bhatt et al. |
| 2008/0292036 A1 | 11/2008 | Wilhelmsson et al. |

FOREIGN PATENT DOCUMENTS

| | | |
|---|---|---|
| WO | WO2005022797 | 3/2005 |
| WO | WO2006099241 A1 | 9/2006 |
| WO | WO2006099343 A1 | 9/2006 |

OTHER PUBLICATIONS

Written Opinion—PCT/US08/050515, International Search Authority—European Patent Office—May 20, 2008.

* cited by examiner

METHODS AND APPARATUS FOR TIME TRACKING USING ASSISTANCE FROM TDM PILOTS IN A COMMUNICATION NETWORK

CLAIM OF PRIORITY UNDER 35 U.S.C. §119

The present Application for Patent is a continuation of U.S. application Ser. No. 11/970,381, filed Jan. 7, 2008, which claims benefit of priority to Provisional Application No. 60/883,993 entitled "Methods and Apparatus for Time Tracking In a Communication Network" filed Jan. 8, 2007, and assigned to the assignee hereof and hereby expressly incorporated by reference herein.

BACKGROUND

1. Field

The present application relates generally to the transmission of information over a distribution network, and more particularly, to methods and apparatus for time tracking using assistance from TDM pilots in a communication network.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, wide area and local area real-time and non real-time services are packed into a transmission frame and delivered to devices on a network. For example, a communication network may utilize Orthogonal Frequency Division Multiplexing (OFDM) to provide communications between a network server and one or more mobile devices. Using this technology a transmission frame can be generated that has data slots packed with services to be delivered over a distribution network as a transmitted waveform.

Typically, a transmitter operates to transmit the transmission frames over a transmission channel to devices in communication with the network. Unfortunately, it is possible that the transmission channel will experience conditions that will make it difficult for receiving devices to recover the transmitted data. For example, it is possible that channel delay spreads will become very long or that channel conditions, which define the channel profile, will change rather quickly. In both instances, the result may be inaccurate OFDM symbol timing at the receiver that prevents the receiver from accurately decoding the transmitted data.

Therefore, it would be desirable to have a system that operates to provide accurate time tracking thereby avoiding the problems associated with long delay spreads and fast changing channel conditions.

SUMMARY

In one or more aspects, a timing system, comprising methods and apparatus, is provided that operates to provide accurate time tracking in a communication network. In an aspect, the timing system operates to utilize a specialized pilot symbol provided at the beginning of a transmission frame to determine a reliable channel estimate from which an accurate delay spread (DS) can be determined. The delay spread is used to determine whether or not to fine tune or temporarily disable the operation of a time tracking algorithm operating at a receiving device. For example, the time tracking algorithm may be a data mode time tracking (DMTT) algorithm.

In an aspect, a method is provided for time tracking in a device operating on a communication network, wherein the device performs a time tracking algorithm. The method comprises determining a delay spread, and modifying at least one parameter used by the time tracking algorithm based on the delay spread.

In another aspect, an apparatus is provided for time tracking in a device operating on a communication network, wherein the device performs a time tracking algorithm. The apparatus comprises computation logic for determining a delay spread, and control logic for modifying at least one parameter used by the time tracking algorithm based on the delay spread.

In another aspect, an apparatus is provided for time tracking in a device operating on a communication network, wherein the device performs a time tracking algorithm. The apparatus comprises means for determining a delay spread, and means for modifying at least one parameter used by the time tracking algorithm based on the delay spread.

In another aspect, a computer program product is provided for time tracking in a device operating on a communication network, wherein the device performs a time tracking algorithm. The computer program product comprises a machine-readable medium comprising a first set of codes for causing a computer to determine a delay spread, and a second set of codes for causing the computer to modify at least one parameter used by the time tracking algorithm based on the delay spread.

In another aspect, at least one integrated circuit is provided that is configured to provide time tracking in a device operating on a communication network, wherein the device performs a time tracking algorithm. The at least one integrated circuit comprises a first module for determining a delay spread, and a second module for modifying at least one parameter used by the time tracking algorithm based on the delay spread.

In another aspect, a method for time tracking in a device operating on a communication network, wherein the device performs a first time tracking algorithm. The method comprises determining a delay spread using a second time tracking algorithm, and modifying at least one parameter used by the first time tracking algorithm if the delay spread is within a selected range.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DESCRIPTION

In one or more aspects, a timing system is provided that operates to provide accurate time tracking in a communication network. For the purpose of this description, aspects of the timing system are described herein with reference to a communication network utilizing OFDM to provide communications between a network server and one or more mobile devices. For example, in an aspect of an OFDM network, the server transmits a transmit waveform over a transmission channel to receiving devices. The transmit waveform comprises a sequence of transmission frames having multiplexed wide area and local content flows with a particular arrangement, sequence, interleaving, and/or other encoding of real-time and/or other than real-time data. In such a network, the timing system operates to periodically (or at selected intervals) determine a reliable channel estimate that is used to determine a channel delay spread that represents the time distance between the first arriving path of content from a transmitter and the last arriving path. The channel delay spread is used to determine whether or not the operation of a time tracking algorithm is to be fine tuned or disabled.

Figure 1:
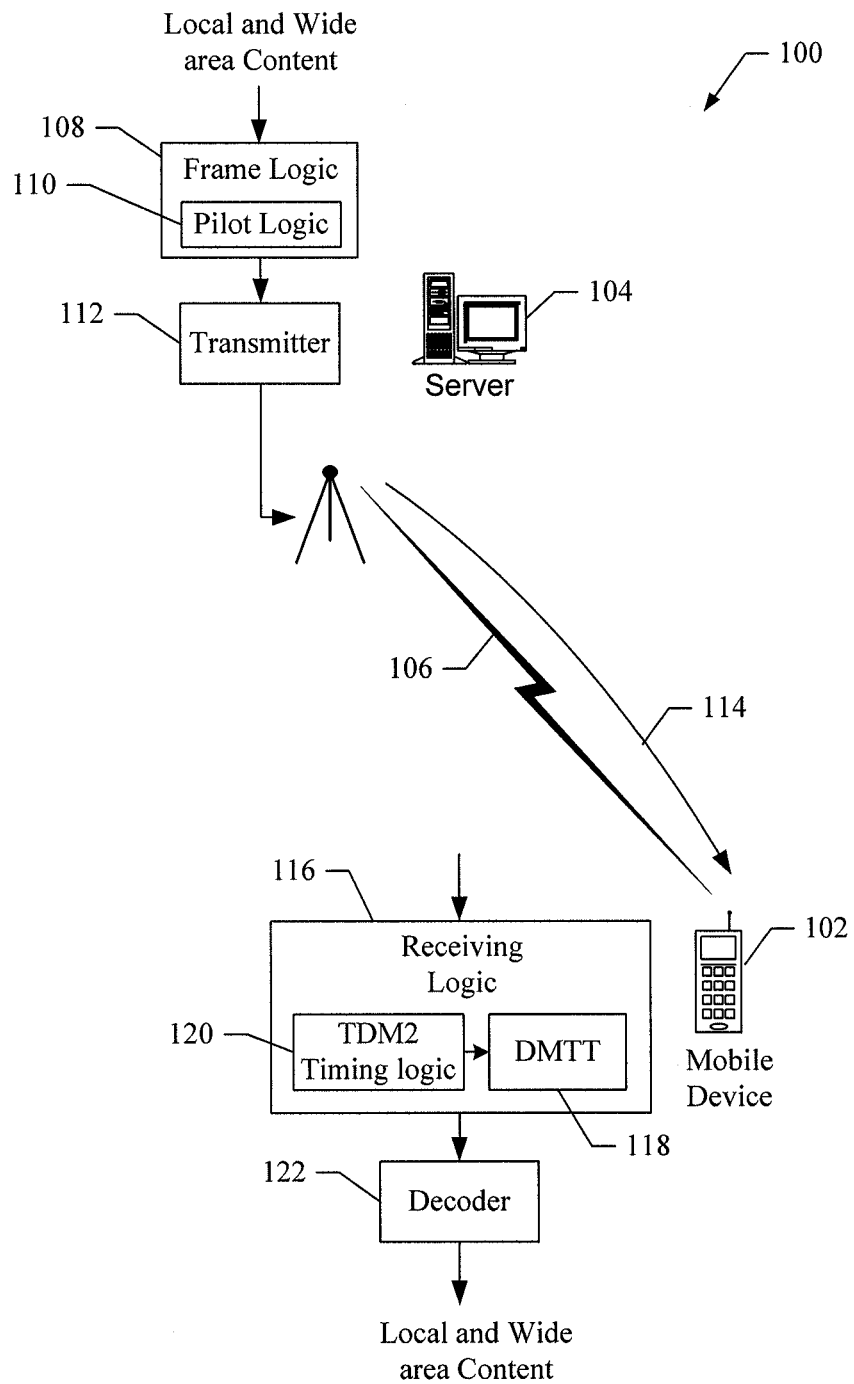
FIG. 1 shows an exemplary network that comprises aspects of a timing system.

The system is well suited for use in wireless communication networks, but may be used in any type of wireless environment, including but not limited to, public networks, such as the Internet, private networks, such as virtual private networks (VPN), local area networks, wide area networks, long haul networks, or any other type of wireless network FIG. 1 shows an exemplary network 100 that comprises aspects of a timing system. The network 100 comprises a mobile device 102, and a server 104. The server 104 operates to transmit information to the device 102 over transmission channel 106. For the purpose of this description, it will be assumed that the transmission channel 106 allows communications between the server 104 and one or more mobile devices using OFDM technology; however, the timing system is suitable for use with other transmission technologies as well. It will further be assumed that a time tracking algorithm executes at the device 102 to facilitate data recovery. For the purpose of this description, the time tracking algorithm is described as a DMTT algorithm, however, the timing system is suitable for use with other types of time tracking algorithms.

In an aspect, the server 104 operates to provide services that may be subscribed to by devices with which the server 104 communicates. The device 102 in this aspect comprises a mobile telephone that communicates with the server 104 through the transmission channel 106. It should be noted that the server 104 may communicate with any number and/or types of devices within the scope of the aspects. For example, other devices suitable for use in aspects of the timing system include, but are not limited to, a personal digital assistant (PDA), email device, pager, a notebook computer, mp3 player, video player, or a desktop computer.

The server 104 comprises (or obtains) content (data) that includes real-time and other than real-time services. For example, the services comprise multimedia content that includes news, sports, weather, financial information, movies, and/or applications, programs, scripts, or any other type of suitable content or service. Thus, the services may comprise video, audio or other information formatted in any suitable format.

The content is input to frame logic 108. The frame logic 108 processes the content to produce transmission frames comprising the content and overhead information. For example, the frame logic 108 may comprise encoders, interleavers, scramblers, mappers, and/or any other type of processing logic that operate to format the wide and local area content to produce the transmission frames. Thus, the transmission frames comprise content that has been encoded into data symbols for transmission over the network 100.

The frame logic 108 comprises pilot logic 110 that operates to generate and insert one or more time domain multiplex (TDM) pilot symbols into the transmission frames. In an aspect, a TDM pilot symbol (referred to hereinafter as a "TDM2" symbol) is configured to comprise a large number of frequency division multiplexed (FDM) pilots. For example, in the TDM2 symbol, any portion or all of the sub-carriers may be configured as FDM pilots. Data symbols, on the other hand, comprise a small portion of sub-carriers configured as FDM pilots with the remaining sub-carriers used for data transmission. In an aspect, the TDM2 pilot symbol may also be used for initial timing acquisition at the beginning of the transmission frames or for any other purpose.

The large number of FDM pilots in the TDM2 symbol is designed to allow a receiving device to determine a reliable channel estimate that is longer than channel estimates that are determined from data symbols. This is due to the fact that the TDM2 symbol provides more unique FDM pilots from which the channel estimate is derived. This relatively long and reliable channel estimate is used in aspects of the timing system to determine accurate physical channel parameters and tracking algorithm parameters that are used to fine tune or otherwise control the operation of a DMTT algorithm executing at a receiving device. In an aspect, a TDM2 pilot symbol is inserted at the beginning of each transmission frame so that the parameters derived from the TDM2 symbol can be determined periodically or at selected intervals.

The transmission frames produced by the frame logic 108 are input to a transmitter 112 that operates to modulate the transmission frames into a transmit waveform that is transmitted over the communication channel 106 to the device 102, as shown by path 114.

The device 102 receives the transmit waveform at receiving logic 116. In an aspect, the receiving logic 116 comprises DMTT logic 118. The DMTT logic 118 operates to perform a time tracking algorithm to provide time tracking based on channel estimates determined from FDM pilot information that is included in each data symbol of the received transmission frames. For example, each data symbol comprises N sub-carriers where a small number of sub-carriers are configured as FDM pilots and the remaining sub-carriers are modulated with data. FDM pilot observations from each data symbol are processed to determine a channel estimate that is used by the DMTT algorithm to perform time tracking.

DMTT Timing Trade-Off

In an aspect, a timing trade-off is associated with the operation of the DMTT algorithm based on the length of the channel delay spread. Through network design, the expected channel delay spread is shorter than the channel estimates obtained from the FDM pilots in the data symbols. Thus, when the channel delay spread is short as compared to the channel estimate, it is acceptable to allow the DMTT algorithm to make fast timing adjustments for the purposes of time tracking without risk of incurring timing ambiguities. However, as the channel delay spread increases and approaches the length of the channel estimate, it is desirable to limit the timing adjustments made by the DMTT algorithm to avoid the possibility of incurring timing ambiguities that may affect data recovery. For example, any DMTT correction results in movement of the channel content within a channel estimate. If movement of the channel content due to DMTT adjustment or a change in the transmission channel results in some content appearing beyond the scope of the channel estimate, an aliasing condition results which causes timing ambiguities that make it difficult to determine signal arrival times. Before such a condition occurs, the timing system operates to fine tune the operation of the DMTT algorithm to prevent content from appearing beyond the scope of the channel estimate and therefore avoiding timing ambiguities. In another aspect, if the delay spread exceeds a selected high threshold value, the timing system operates to disable the DMTT algorithm until the channel stabilizes and/or the delay spread becomes shorter.

For the purpose of this document, a complete description of the operation of the DMTT logic 118 is not essential and is therefore not provided. However, a description of a suitable embodiment of the DMTT logic 118 can be found in U.S. patent application Ser. No. 11/371,536, entitled "Time tracking for a communication system" filed Mar. 8, 2006, and that document is incorporated by reference herein for all purposes.

Adjusting DMTT Based on Channel Delay Spread

In an aspect, the receiving logic 116 comprises TDM2 timing logic 120 that operates to process a TDM2 symbol at the beginning of a transmission frame to determine physical channel parameters and tracking algorithm parameters that are used to fine tune or adjust the operation of the DMTT logic 118.

In an aspect, a TDM2 symbol comprises a larger number of FDM pilots than the data symbols. Using this large number of pilots, the TDM2 timing logic 120 operates to produce a channel estimate that is longer and thus more reliable than the channel estimate determined by the DMTT logic 118. For example, the longer channel estimate is less prone to timing ambiguities because it less likely that content will appear beyond the scope of the channel estimate. This reliable channel estimate is processed by the TDM2 timing logic 120 to determine one or more physical channel parameters, such as delay spread, that are used to detect when the channel conditions are such that it is unlikely that the DMTT logic 118 will be able to accurately perform its time tracking functions. When such a condition is detected, the TDM2 timing logic 120 operates to fine tune (or modify) one or more tracking algorithm parameters used by the DMTT logic 118 to reduce the risk of encountering timing ambiguities. In another aspect, if it is determined from the physical channel parameters that it is unlikely that the DMTT logic 118 will be able to perform its time tracking functions accurately, the TDM2 timing logic 120 operates to disable the time tracking functions of the DMTT logic 118 for one or more transmission frames.

As a result, the timing system provides, in effect, a second timing algorithm that processes received TDM2 symbols to obtain a reliable channel estimate from which physical channel parameters, such as delay spread can be determined. These physical channel parameters are used to determine when to fine tune tracking algorithm parameters used by a first timing algorithm provided by the DMTT logic 118. The physical channel parameters are also used to determine when to disable the first timing algorithm provided by the DMTT logic 118 for one or more transmission frames. A more detailed description of the operation of the TDM2 timing logic 120 is provided in another section of this document.

Once the DMTT logic 118 has tracked and recovered the transmitted data, the output of the receiving logic 116 is input to a decoder 122 that operates to decode the received data to recover the transmitted content.

Thus, aspects of the timing system provide accurate time tracking in a communication network by using the assistance of TDM2 pilot symbols. It should be noted that the timing system is not limited to the implementations described with reference to FIG. 1, and that other implementations are possible within the scope of the described aspects.

Figure 2:
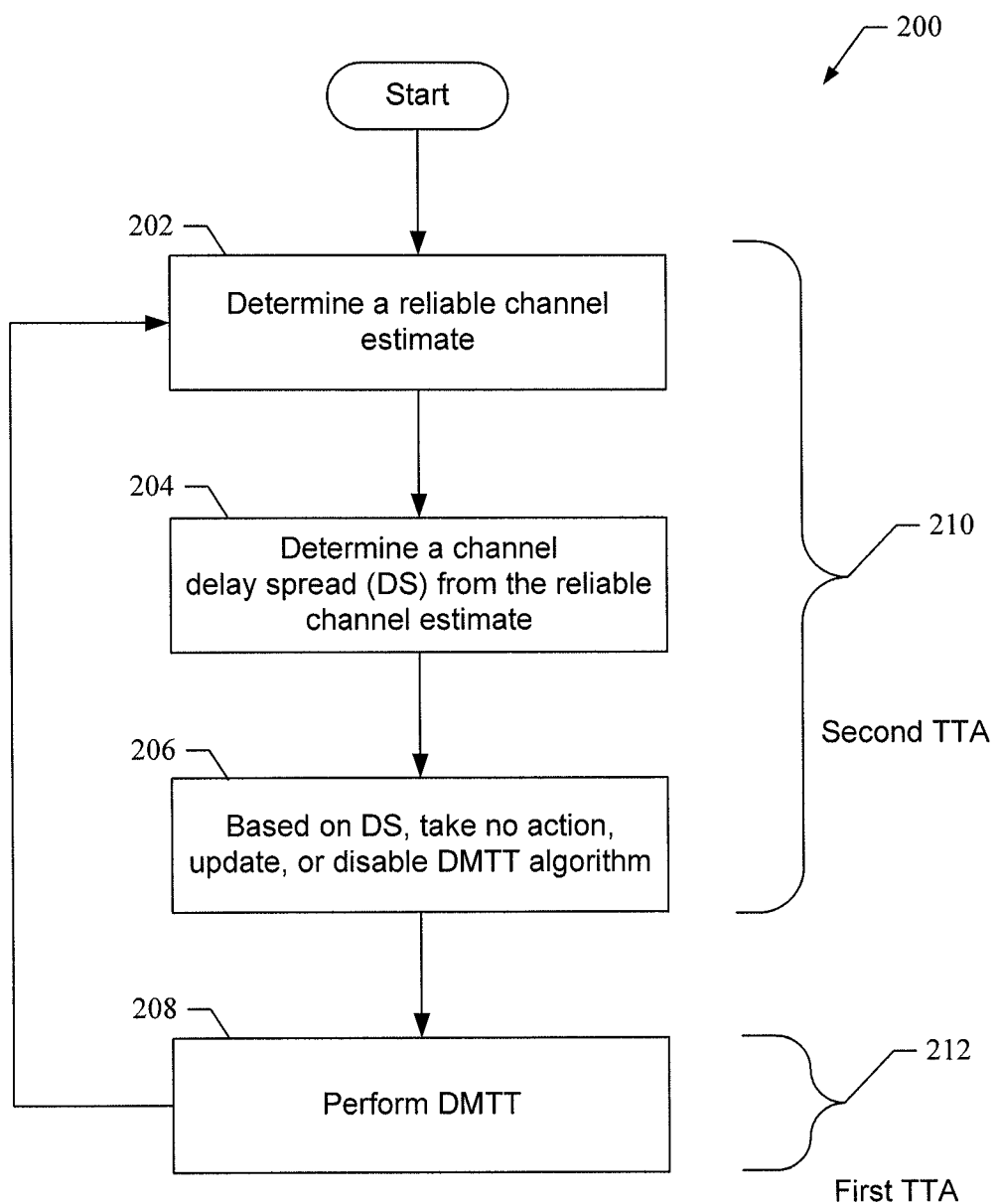
FIG. 2 shows an overview diagram that illustrates operations provided by aspects of the timing system.

FIG. 2 shows a diagram 200 that illustrates operations provided by aspects of the timing system. For example, one or more of the operations illustrated in the diagram 200 are provided by the TDM2 timing logic 120 shown in FIG. 1. The diagram 200 is described briefly below while more detailed descriptions of each operation are provided later in this document.

At block 202, a reliable channel estimate is determined. For example, the TDM2 timing logic 120 utilizes pilot observations from a received TDM2 symbol to determine the reliable channel estimate. In an aspect, the term "reliable" is used herein to indicate that the channel estimate derived from TDM2 pilot observations is longer and less prone to timing ambiguities than a channel estimate derived from pilot observations in data symbols. In an aspect, the reliable channel estimate may be determined periodically or at any desired time internal.

At block 204, a channel delay spread is determined. In an aspect, the channel delay spread is determined from the reliable channel estimate. For example, the delay spread represents the time distance between the first arriving path of content from a transmitter and the last arriving path. In an aspect, one or more tracking algorithm parameters are also determined from the reliable channel estimate. Thus, every delay spread value (or selected range of values) can have an associated set of tracking algorithm parameters. In another aspect, one or more tracking algorithm parameters associated with each delay spread (or range of delay spreads) is stored at the TDM2 timing logic 120.

At block 206, based on the delay spread, a determination is made whether to take no action, update, or disable the time tracking operation of the DMTT algorithm. For example, if the DS is equal to or below a selected low threshold, then no action is taken with respect to the operation of the DMTT algorithm. If the DS is equal to or above a high threshold value, then the DMTT algorithm is disabled for one or more received transmission frames. If the DS is within the low and high threshold values, then tracking algorithm parameters of the DMTT algorithm are updated based on the DS value. For example, one or more of the tracking algorithm parameters associated with the DS value are used to update the DMTT algorithm.

At block 208, DMTT algorithm operates to provide time tracking for the purpose of data demodulation. In an aspect, the DMTT algorithm represents a first time tracking algorithm (TTA), as illustrated at 212. This first TTA 212 operates based on tracking parameters derived from pilot observations in received data symbols. In an aspect, the blocks 202, 204, and 206 comprise a second time tracking algorithm, as illustrated at 210. If the DS determined by the second TTA 210 is equal to or below a low threshold, the first TTA 212 is allowed to operate normally. If the DS determined by the second TTA 210 is within a selected range, the DS is used to determine tracking algorithm parameters that are used to update the first TTA 212. If the DS determined by the second TTA 210 is equal to or exceeds a high threshold, the first TTA 212 is disabled for one or more transmission frames. Thus, the timing system operates to utilize the second TTA 210 to fine tune and/or control the operation of the first TTA 212.

It should be noted that the first TTA 212 is described as a DMTT algorithm, however, the timing system is not limited to use with only DMTT algorithms, and may be used to fine tune and/or control the operation of any other suitable time tracking algorithm.

TDM2 Configuration

Figure 3:
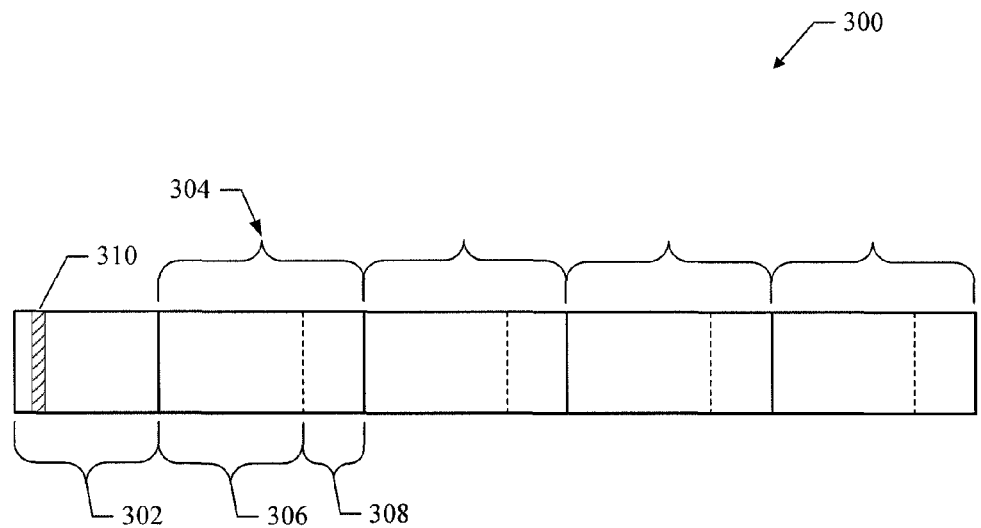
FIG. 3 shows an exemplary transmission superframe for use in aspects of a timing system.

FIG. 3 shows an exemplary transmission frame 300 for use in aspects of a timing system. For example, the frame 300 is generated by the frame logic 108 for transmission over the communication channel 106. The frame 300 comprises overhead information 302, and four sub-frames illustrated at 304. Each of the sub-frames comprises a wide area partition 306 and a local area partition 308. The wide area partition 306 comprises wide area data. The local area partition 308 comprises local area data. The overhead information 302 operates to identify the locations of the wide area data and the local area data in each sub-frame.

The overhead information 302 also comprises a TDM2 symbol 310. For example, in an aspect, the TDM2 symbol 310 is generated by the pilot logic 110. The TDM2 symbol 310 is configured to comprise a larger number of FDM pilots than are provided in each data symbol. In aspects of the timing system, a receiving device operates to process pilot observations from a received TDM2 symbol 310 to determine a reliable channel estimate. From the reliable channel estimate, physical channel parameters and tracking algorithm parameters are determined that are used to fine tune and/or adjust the operation of a DMTT algorithm.

Figure 4:
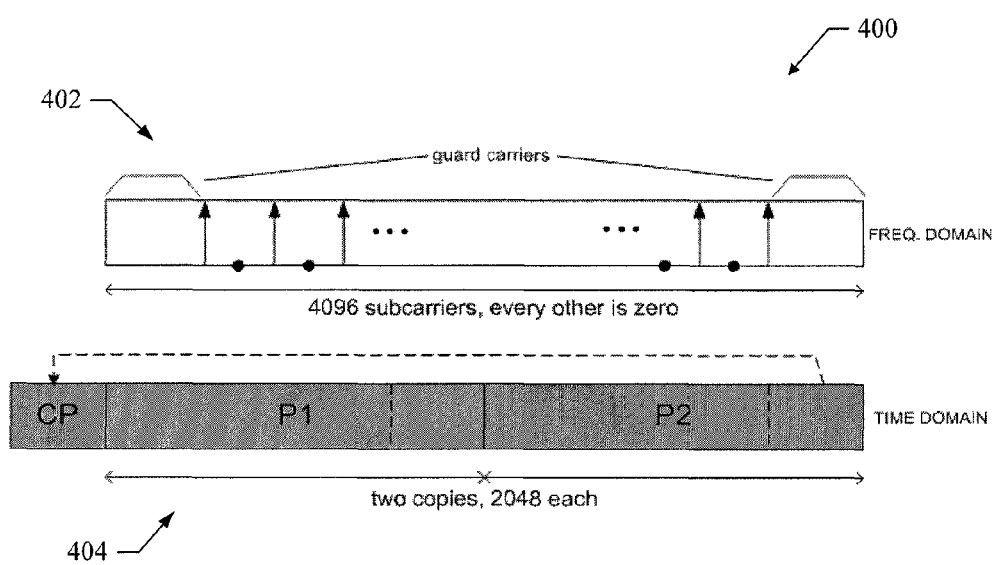
FIG. 4 shows exemplary frequency and time domain versions of a TDM2 pilot symbol for use in aspects of a timing system.

FIG. 4 shows an exemplary TDM2 symbol 400 in both the frequency and time domains for use in aspects of a timing system. It should be noted that the TDM2 symbol 400 is just one implementation and that other implementations are possible. In the frequency domain, shown at 402, the TDM2 symbol 400 comprises guard carriers and 4000 non-zero quadrature phase shift keying (QPSK) carriers separated by zeros. Each non-zero carrier comprises a pair of bits from the output of one of four scramblers. For example, in an aspect, the scramblers are provided by the frame logic 108 shown in FIG. 1. Zero insertion guarantees that the TDM2 symbol 400 in the time domain, as shown at 404, comprises two periods (P1, P2) having 2048 samples each.

In an aspect, the timing system operates to process a selected number of samples of the TDM2 symbol 400 to determine a reliable channel estimate that is longer than channel estimates determined from data symbols. The longer and reliable channel estimate determined from the TDM2 symbol is used to determine physical channel parameters and tracking algorithm parameters that are used to fine tune and/or adjust the operation of a DMTT algorithm.

Second Time Tracking Algorithm

Figure 5:
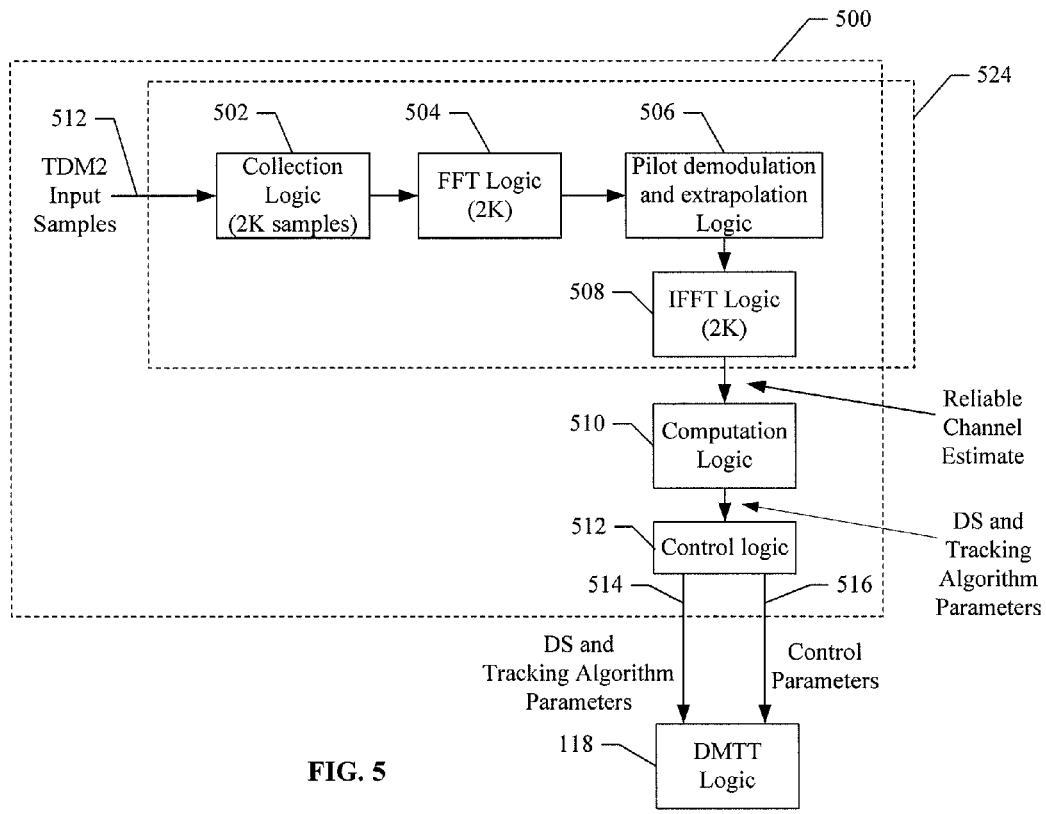
FIG. 5 shows exemplary timing logic for use in aspects of a timing system

FIG. 5 shows timing logic 500 for use in aspects of a timing system. For example, the timing logic 500 is suitable for use as the TDM2 timing logic 120 shown in FIG. 1. In an aspect, the timing logic 500 comprises collection logic 502, Fast Fourier Transform (FFT) logic 504, pilot demodulation and extrapolation logic 506, inverse Fast Fourier Transform (IFFT) logic 508, computation logic 510, and control logic 512. For clarity, the operation of the timing logic 500 will be discussed with reference to a TDM2 symbol 600 illustrated in FIG. 6.

Figure 6:
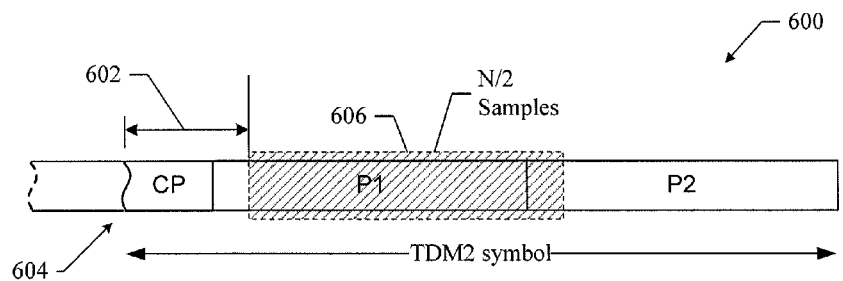
FIG. 6 illustrates the collection of samples of a TDM2 symbol for use in aspects of a timing system.

FIG. 6 illustrates the collection of samples of the TDM2 symbol 600 for use in aspects of a timing system. For example, the TDM2 symbol 600 may be part of a transmission frame that is received at a receiving device, such as the device 102 shown in FIG. 1.

Determining a Reliable Channel Estimate (Block 202)

The following description illustrates how aspects of the timing system operate to determine a reliable channel estimate as provided at block 202 in FIG. 2. It should be noted that the description below provides just one implementation and that other implementations are possible within the scope of the timing system.

The collection logic 502 comprises at least one of a CPU, processor, gate array, hardware logic, memory, and/or hardware executing software. In an aspect, the collection logic 502 operates to collect samples of a received TDM2 symbol 512 for processing by the FFT logic 504. As illustrated in FIG. 6, collection begins after a delay 602 from the location of a symbol boundary 604. Note that the collected samples 606 represent an amount equal to N/2 where N is the length of the TDM2 symbol 600. A cyclic prefix (CP) is shown at the beginning of the TDM2 symbol 600.

The FFT logic 504 comprises at least one of a CPU, processor, gate array, hardware logic, memory, and/or hardware executing software. In an aspect, the FFT logic 504 operates to perform an FFT on the samples 606 captured by the collection logic 502. In an aspect, the operation of the collection logic 502 and the structure of the TDM2 symbol ensure that 2048 samples of the TDM2 pilot symbol are captured. As a result of the operation of the FFT logic 504, a frequency domain version of the collected samples 606 of the TDM2 symbol is produced. For example, the frequency domain version of the TDM2 symbol is illustrated in FIG. 4 and comprises 2000 non-zero carriers and 48 guard carriers. The non-zero carriers are modulated by channel information. In order to recover the channel information, i.e., estimate the channel impulse response up to 2048 taps, the scrambling of the non-zero carriers is undone and the carriers that have been omitted are zeroed out before the IFFT logic 508 performs an inverse Fourier transform. This operation is called TDM2 pilot symbol demodulation and extrapolation and is describe below.

The pilot demodulation and extrapolation logic 506 comprises at least one of a CPU, processor, gate array, hardware logic, memory, and/or hardware executing software. In an aspect, each output sample of the 2048 point FFT provided by the FFT logic 504 is a complex number where the real and the imaginary numbers are each 9-bit signed numbers. The removal of the pilot modulation comprises a multiplication of each pilot carrier with a reference value corresponding to that carrier, and which is made available at the receiver. The result of the TDM2 pilot symbol demodulation and extrapolation is provided to the IFFT logic 508.

The IFFT logic 508 comprises at least one of a CPU, processor, gate array, hardware logic, memory, and/or hardware executing software. In an aspect, the IFFT logic 508 operates to perform an inverse Fast Fourier Transform on the output of the demodulation and extrapolation logic 506 to produce a time-domain reliable channel estimate. This channel estimate is referred to as a reliable channel estimate because it is derived from a large number of pilot observations associated with a received TDM2 symbol. Thus, in aspects of the timing system, channel estimation logic 524 comprises blocks 502, 504, 506, and 508, which operate to provide a reliable channel estimate based on received TDM2 pilot symbols.

Determining a Channel Delay Spread (Block 204)

The following description illustrates how aspects of the timing system operate to determine a channel DS as provided at block 204 in FIG. 2. It should be noted that the description below provides just one implementation and that other implementations are possible within the scope of the timing system.

The computation logic 510 comprises at least one of a CPU, processor, gate array, hardware logic, memory, and/or hardware executing software. In an aspect, the computation logic 510 operates to provide the following functions.
1. Process the reliable channel estimate to determine a first arriving path (FAP), last arriving path (LAP), and corresponding DS.
2. Process the channel estimate to determine tracking algorithm parameters, such as search window size, window position, time offset from a selected reference, and/or any other tracking algorithm parameters.

Figure 7:
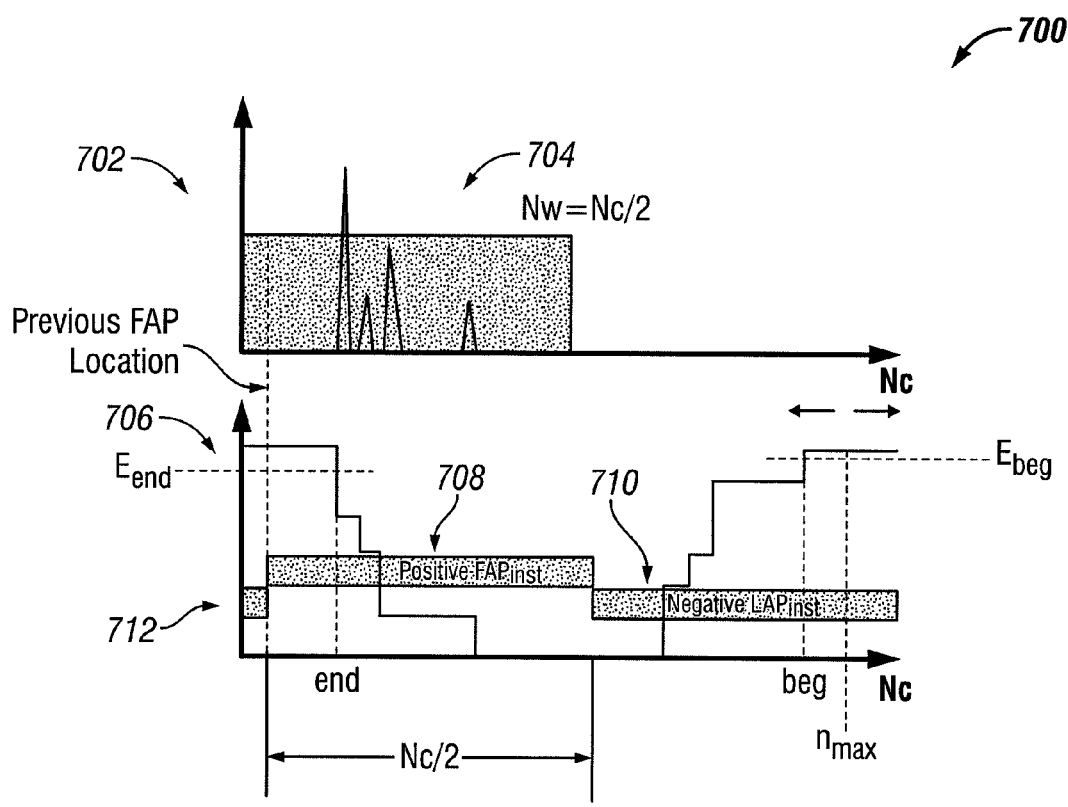
FIG. 7 shows graphs that illustrate the detection of a first arriving path and a last arriving path for use in aspects of a timing system.

FIG. 7 shows graphs 700 illustrating the operation of the computation logic 510 for use in aspects of a timing system. For example, the computation logic 510 operates to process instantaneous and averaged channel estimates to detect a FAP and a LAP. In an aspect, the FAP and LAP represent the first and last arriving paths of a particular symbol. For example, a symbol may be transmitted from multiple transmitters and/or may experience spreading and/or multi-path propagation effects. The FAP and LAP indicate the beginning of the received symbol energy and ending of the received symbol energy, respectively, and are used to determine the channel DS.

In an aspect, the computation logic 510 operates to perform one or more of the following functions.
1. Receive a reliable instantaneous channel estimate determined from TDM2 pilot symbols (i.e., at the beginning of each transmission superframe).
3. Maintain an averaged channel estimate based on the received instantaneous channel estimates.
4. Compute instantaneous $FAP_{inst}$ and $LAP_{inst}$ based on an instantaneous channel estimate.
5. Compute averaged $FAP_{avg}$ and $LAP_{avg}$ based on the averaged channel estimate.
6. Determine a final FAP, a final LAP, and a DS.

In an aspect, the computation logic 510 operates to process the instantaneous channel estimate to determine the $FAP_{inst}$ and $LAP_{inst}$ parameters. The computation logic 510 also processes the averaged channel estimate to determine the $FAP_{avg}$ and $LAP_{avg}$ parameters.

The following algorithm is performed by the computation logic 510 to process both the instantaneous channel estimate and the averaged channel estimate. To avoid redundancy, the algorithm is described below with reference to processing the instantaneous channel estimate to determine the $FAP_{inst}$ and $LAP_{inst}$ parameters. The averaged channel estimate can be processed in the same way to determine $FAP_{avg}$ and $LAP_{avg}$ parameters.

Referring now to FIG. 7, a first graph illustrates an instantaneous channel estimate 702 generated by the IFFT logic 508. The channel estimate 702 has a length parameter of $N_c$, which is determined from the number of pilot observations selected and processed from a received TDM2 pilot symbol. A window 704 is defined that has a length of $N_c/2$, however a shorter window may be defined. The window 704 is moved through the channel estimate 702 and the energy within the window is accumulated to produce an accumulated energy profile that is illustrated in the graph 706.

In an aspect, the computation logic 510 operates to process the accumulated energy profile to determine beginning (beg) and end (end) parameters. The computation logic 510 operates to perform the following algorithm to determine the "beg" and "end" parameters from the accumulated energy profile 706.
1. Find the location of the maximum accumulated energy ($n_{max}$) and the maximum energy ($E_{max}$) value.
2. Set beginning ($E_{beg}$) and ending ($E_{end}$) energy thresholds based on $E_{max}$. These thresholds may be the same or different.
3. Starting from the location of $n_{max}$ and search up to $N_w$ positions in both directions.
4. Detect the "beg" and "end" locations as the last crossings of the corresponding thresholds.

Once the "beg" and "end" locations are determined, the instantaneous $FAP_{inst}$ and $LAP_{inst}$ parameters are calculated. The following algorithm is used to determine $FAP_{inst}$ and $LAP_{inst}$ parameters.
1. If
   end is in the positive region (708) or the negative+region (712);
   then;

$FAP_{inst}$=end;

$LAP_{inst}$=(beg+$N_w$) % $N_c$;

2. If
   end is in the negative region-(710)
   then $FAP_{inst}$=end-$N_c$ $LAP_{inst}$=(beg+$N_w$) % $N_c$ In an aspect, once the $FAP_{inst}$, $LAP_{inst}$, $FAP_{avg}$, and $LAP_{avg}$ are determined, they are combined to produce final FAP and LAP values according to the following.

$FAP=\min(FAP_{inst}, FAP_{avg})$ $LAP=\max(LAP_{inst}, LAP_{avg})$

The computation logic 510 also operates to determine a channel delay spread. In an aspect, the delay spread is determined by the computation logic 510 based on processing the FAP and LAP determined above according to the following expression.

DS=LAP-FAP

In additional aspects of the timing system, it is also possible to use other techniques to determine the channel delay spread. For example, one of the following techniques may also be used to determine the delay spread.
1. Compute channel delay spread based only on the instantaneous reliable channel estimate.
2. Obtain a delay spread computed by the DMTT algorithm.

In an aspect, the computation logic 510 operates to process the reliable channel estimate to generated one or more tracking algorithm parameters. For example, the tracking algorithm parameters include, but are not limited to, search window size, window position, time offset from a selected reference, and/or any other tracking algorithm parameters. Any suitable technique may be used to process reliable channel estimates to determine the tracking algorithm parameters.

Actions Based on the Computed Delay Spread (Block 206)

The following description illustrates how aspects of the timing system operate to determine actions based on the computed DS as provided at block 206 in FIG. 2. It should be noted that the description below provides just one implementation and that other implementations are possible within the scope of the timing system.

Referring again to FIG. 5, the control logic 512 comprises at least one of a CPU, processor, gate array, hardware logic, memory, and/or hardware executing software. The control logic 512 operates to determine one or more control parameters 516 based on the computed DS. The control parameters 516 are output to control the operation of a DMTT algorithm provided by the DMTT logic 118. In an aspect, the control parameters 516 operate to update, enable, or disable the time tracking functions of the DMTT algorithm for one or more received transmission frames. If the control logic 512 determines that one or more tracking parameters of the DMTT algorithm is to be updated, the tracking parameters (including the DS) are provided to the DMTT logic 118, as shown at 514. In an aspect, the control logic 512 operates to provide the following functions.

1. Set the control parameters 516 to allow normal DMTT operation if the DS is equal to or below a low threshold value.
2. Set the control parameters 516 to disable time tracking operations of the DMTT algorithm for one or more transmission frames if the DS is equal to or exceeds a high threshold.
3. Otherwise, update one or more tracking algorithm parameters of the DMTT algorithm based on the computed DS.

In an aspect, the control logic 512 operates to compare the computed DS to the low and high threshold values, and based on the comparison; provide a control parameter that is output to DMTT logic 118 to control the operation of the DMTT algorithm. Table 1 shows exemplary control parameter values and associated DMTT actions.

TABLE 1

| Comparison | Control Parameter Value | DMTT Action |
|---|---|---|
| DS <= low threshold | 0 | Enable Normal operation |
| Low threshold < DS < high threshold | 1 | Update DMTT tracking algorithm parameters |
| DS => high threshold | 2 | Disable time tracking |

In an aspect, when the control parameter is set to "0", the DMTT algorithm continues its normal operations. When the control parameter is set to "1", the DMTT algorithm updates its tracking algorithm using one or more of the tracking algorithm parameters 514 determined by the computation logic 510. When the control parameter is set to "2", the DMTT algorithm operates to disable its time tracking functions for one transmission frames.

In an aspect, the timing system comprises a computer program product having one or more program instructions ("instructions") or sets of codes ("codes) embodied (or stored) on a machine-readable medium, which when executed by at least one processor, operate to provide the functions of the timing system described herein. For example, the sets of codes may be loaded into the TDM2 timing logic 500 from a machine-readable media, such as a floppy disk, CDROM, memory card, FLASH memory device, RAM, ROM, or any other type of memory device or machine-readable medium. In another aspect, the sets of codes may be downloaded into the TDM2 timing logic 500 from an external device or network resource. The sets of codes, when executed, operate to provide aspects of a timing system as described herein.

Thus, the timing logic 500 operates to determine a delay spread and one or more tracking algorithm parameters based on a reliable channel estimate determined from a received TDM2 pilot symbol. Based on the delay spread, the tracking algorithm parameters are then used to fine tune and/or adjust the operation of a DMTT algorithm. If the delay spread is too large, the DMTT algorithm is disabled. It should be noted that the timing logic 500 is just one implementation and that other implementations are possible within the scope of the aspects.

Figure 8:
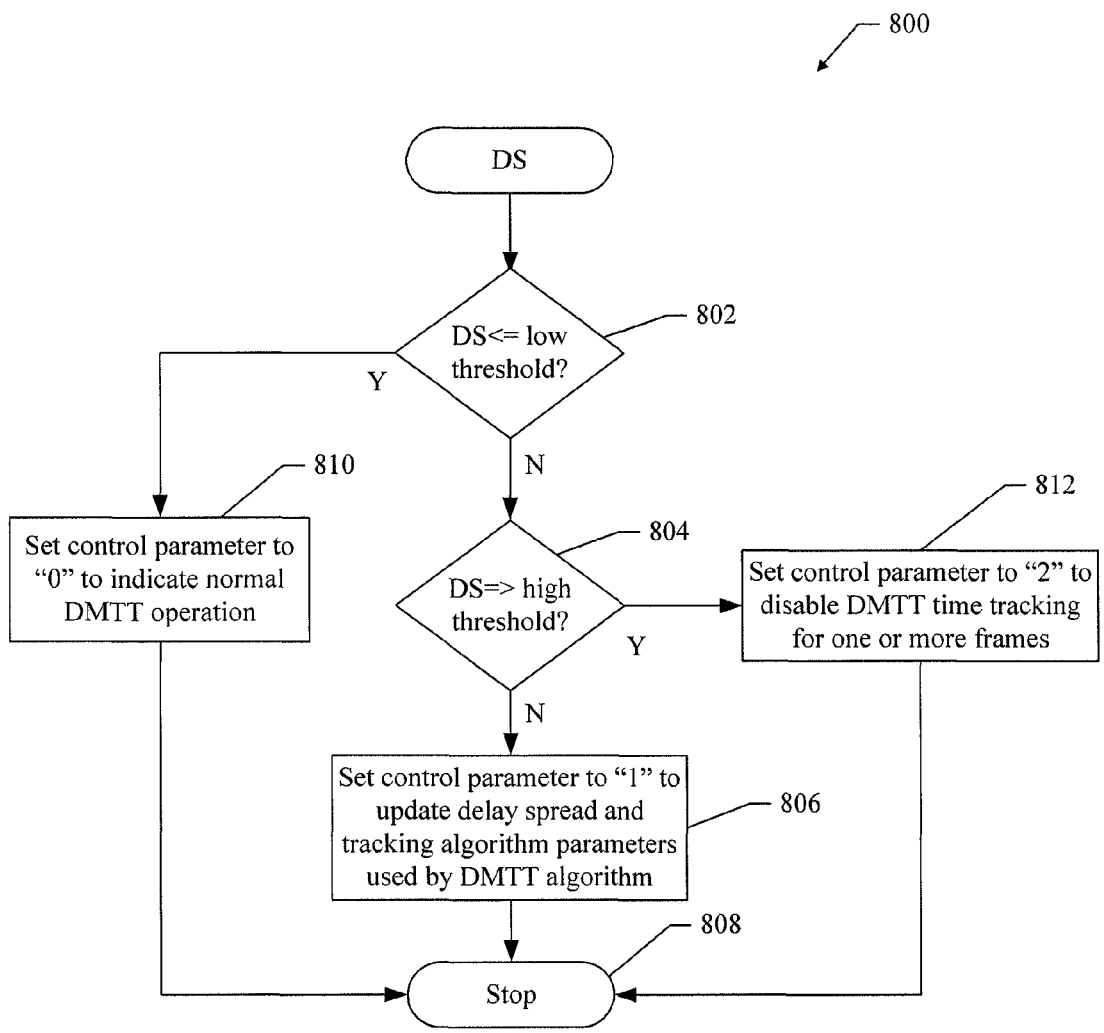
FIG. 8 shows an exemplary method for providing aspects of a timing system.

FIG. 8 shows an exemplary method 800 for providing time tracking for use in aspects of a timing system. For example, in an aspect, the method 800 is performed by the control logic 512 shown in FIG. 5 to fine tune or disable the operation of a DMTT algorithm based on a computed delay spread.

At block 802, a determination is made as to whether the computed DS is less than or equal to a low threshold. For example, in an aspect, the control logic 512 operates to compare the determined DS to a low threshold value. If the DS is determined to be less than or equal to the low threshold value, the method proceeds to block 810. In this case, there is no need to adjust the operation of the DMTT algorithm. If the DS is determined to be greater than the low threshold value, the method proceeds to block 804.

At block 810, a control parameter is set to indicate normal DMTT operation. In an aspect, the control logic 512 operates to set the control parameter to "0" as indicated in Table 1. The method then stops at block 808.

At block 804, a determination is made as to whether the determined DS is greater than or equal to a high threshold. For example, in an aspect, the control logic 510 operates to compare the determined DS to a high threshold value. If the DS is determined to be greater than or equal to the high threshold value, the method proceeds to block 812. In this case, the DMTT algorithm will be disabled for one or more transmission frames. If the DS is determined to be less than the high threshold value, the method proceeds to block 806.

At block 812, the DMTT algorithm is disabled for one or more transmission frames. For example, the control logic 512 operates set a control parameter 516 to a value of "2" to control the DMTT logic 118 to disable or in any other way temporarily pause or suspend the time tracking functions of the DMTT algorithm for a selectable number of transmission frames. The method then ends at block 808.

At block 806, one or more tracking algorithm parameters used by the DMTT algorithm are updated. In an aspect, the control logic 510 operates to set a control parameter to a value of "1" to cause the DMTT logic 118 to update one or more tracking algorithm parameters used by the DMTT algorithm so as to fine tune the operation of the time tracking functions of the DMTT logic 118. As a result, the DMTT logic 118 will operate to limit the timing adjustments made by the DMTT algorithm to avoid the possibility of incurring timing ambiguities that may affect data recovery.

Thus, the method 800 provides aspects of control functions for use in a timing system that operates to fine tune or adjust the operation of a DMTT algorithm in a receiving device. It should be noted that the method 800 represents just one implementation and the changes, additions, deletions, combinations or other modifications of the method 800 are possible within the scope of the aspects.

Figure 9:
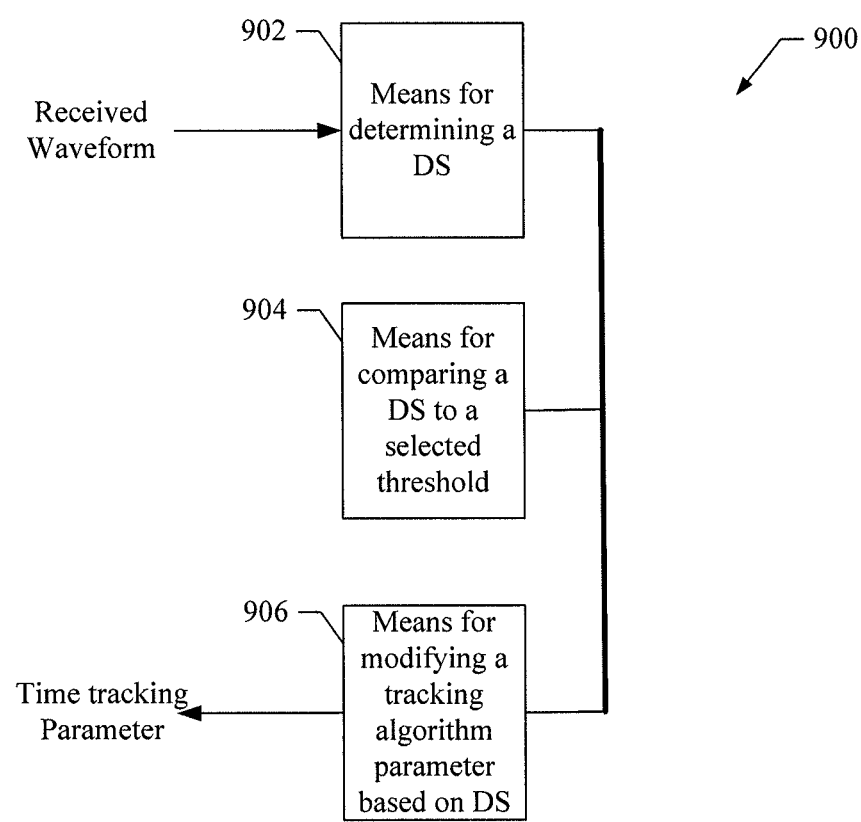
FIG. 9 shows exemplary timing logic for use in aspects of a timing system.

FIG. 9 shows exemplary aspects of a timing system 900. The timing system 900 comprises means (902) for determining a delay spread. For example, in an aspect, the means 902 comprises the computation logic 510.

The timing system 900 also comprises means (904) for comparing the delay spread to at least one threshold value. For example, in an aspect, the means 904 comprises the control logic 512.

The timing system 900 also comprises means (906) for modifying at least one parameter used by a time tracking algorithm based on the delay spread. For example, in an aspect, the means 906 comprises the control logic 512.

In an aspect, the means (902-906) comprise one or more integrated circuits configured to provide aspects of a timing system as described herein.

Therefore various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a timing system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for time tracking in a device operating on a communication network, wherein the device performs a time tracking algorithm, the method comprising:
   determining a delay spread based on a channel estimate;
   enabling the time tracking algorithm according to a default configuration when the delay spread is below a first threshold;
   disabling the time tracking algorithm for one or more received transmission frames when the delay spread is equal to or exceeds a second threshold; and
   updating at least one parameter of the time tracking algorithm based upon the delay spread when the delay spread is between the first threshold and the second threshold.

2. The method of claim 1, further comprising:
   receiving a time division multiplex (TDM) pilot symbol; and
   determining the delay spread based on the TDM pilot symbol.

3. The method of claim 2, further comprising:
   determining the channel estimate from the TDM pilot symbol;
   determining a first arriving path (FAP) and a last arriving path (LAP) from the channel estimate; and
   computing the delay spread based on the FAP and the LAP.

4. The method of claim 1, wherein the at least one parameter of the time tracking algorithm comprises at least one of a window location, and time offset.

5. An apparatus for time tracking in a device operating on a communication network, wherein the device performs a time tracking algorithm, the apparatus comprising:
   computation logic for determining a delay spread based on a channel estimate; and
   control logic configured to:
      enable the time tracking algorithm according to a default configuration when the delay spread is below a first threshold;
      disable the time tracking algorithm for one or more received transmission frames when the delay spread is equal to or exceeds a second threshold; and
      update at least one parameter of the time tracking algorithm based upon the delay spread when the delay spread is between the first threshold and the second threshold.

6. The apparatus of claim 5, wherein the computation logic is configured to determine the delay spread based on a received time division multiplex (TDM) pilot symbol.

7. The apparatus of claim 6, further comprising channel estimation logic configured to determine the channel estimate from the TDM pilot symbol.

8. The apparatus of claim 7, wherein the computation logic is configured to determine the delay spread based on the channel estimate by determining a first arriving path (FAP) and a last arriving path (LAP) from the channel estimate and computing the delay spread based on the FAP and the LAP.

9. The apparatus of claim 5, wherein the at least one parameter of the time tracking algorithm comprises at least one of a window location, and time offset.

10. An apparatus for time tracking in a device operating on a communication network, wherein the device performs a time tracking algorithm, the apparatus comprising:
    means for determining a delay spread based on a channel estimate;
    means for enabling the time tracking algorithm according to a default configuration when the delay spread is below a first threshold;

means for disabling the time tracking algorithm for one or more received transmission frames when the delay spread is equal to or exceeds a second threshold; and means for updating at least one parameter of the time tracking algorithm based upon the delay spread when the delay spread is between the first threshold and the second threshold.

11. The apparatus of claim 10, further comprising:
means for receiving a time division multiplex (TDM) pilot symbol; and
means for determining the delay spread based on the TDM pilot symbol.

12. The apparatus of claim 11, wherein means for determining a delay spread based on the channel estimate comprises:
means for determining the channel estimate from the TDM pilot symbol;
means for determining a first arriving path (FAP) and a last arriving path (LAP) from the channel estimate; and
means for computing the delay spread based on the FAP and the LAP.

13. The apparatus of claim 10, wherein means for updating the at least one parameter of the time tracking algorithm comprises means for updating at least one of a window location, and time offset.

14. A computer-readable storage medium comprising a computer program product for time tracking in a device operating on a communication network, wherein the device performs a time tracking algorithm, the computer-readable storage medium comprising:
a first set of codes for causing a computer to determine a delay spread based on a channel estimate;
a second set of codes for causing the computer to enable the time tracking algorithm according to a default configuration when the delay spread is below a first threshold;
a third set of codes for causing the computer to disable the time tracking algorithm for one or more received transmission frames when the delay spread is equal to or exceeds the a second threshold; and
a fourth set of codes for causing the computer to update at least one parameter of the time tracking algorithm based upon the delay spread when the delay spread is between the first threshold and the second threshold.

15. The computer-readable storage medium of claim 14, further comprising:
a fifth set of codes for causing the computer to receive a time division multiplex (TDM) pilot symbol; and
a sixth set of codes for causing the computer to determine the delay spread based on the TDM pilot symbol.

16. The computer-readable storage medium of claim 15, wherein the first set of codes for causing the computer to determine a delay spread based on the channel estimate comprises:
a seventh set of codes for causing the computer to determine the channel estimate from the TDM pilot symbol;
an eighth set of codes for causing the computer to determine a first arriving path (FAP) and a last arriving path (LAP) from the channel estimate; and
a ninth set of codes for causing the computer to compute the delay spread based on the FAP and the LAP.

17. The computer-readable storage medium of claim 14, wherein the at least one parameter of the time tracking algorithm comprises at least one of a window location, and time offset.

18. At least one integrated circuit configured to provide time tracking in a device operating on a communication network, wherein the device performs a time tracking algorithm, the at least one integrated circuit comprising:
a first module for determining a delay spread based on a channel estimate; and
a second module for enabling the time tracking algorithm according to a default configuration when the delay spread is below a first threshold, disabling the time tracking algorithm for one or more received transmission frames when the delay spread is equal to or exceeds a second threshold value, and updating at least one parameter of the time tracking algorithm based upon the delay spread when the delay spread is between the first threshold and the second threshold.

19. The at least one integrated circuit of claim 18, further comprising:
a third module for receiving a time division multiplex (TDM) pilot symbol; and
a fourth module for determining the delay spread based on the TDM pilot symbol.

20. The at least one integrated circuit of claim 19, wherein the first module for determining the delay spread based on the channel estimate comprises:
a fifth module for determining the channel estimate from the TDM pilot symbol;
a sixth module for determining a first arriving path (FAP) and a last arriving path (LAP) from the channel estimate; and
a seventh module for computing the delay spread based on the FAP and the LAP.

21. The at least one integrated circuit of claim 18, wherein the at least one parameter of the time tracking algorithm comprises at least one of a window location, and time offset.

22. A method for time tracking in a device operating on a communication network, wherein the device performs a first time tracking algorithm, the method comprising:
determining a delay spread using a second time tracking algorithm;
enabling the first time tracking algorithm according to a default configuration when the delay spread is below a first threshold,
disabling the first time tracking algorithm for one or more received transmission frames when the delay spread is equal to or exceeds a second threshold; and
updating at least one parameter of the first time tracking algorithm based upon the delay spread when the delay spread is between the first threshold and the second threshold.

23. The method of claim 22, wherein the at least one parameter of the first time tracking algorithm comprises at least one of a window location, and time offset.

* * * * *